US008058972B2

(12) United States Patent
Mohanty

(10) Patent No.: US 8,058,972 B2
(45) Date of Patent: Nov. 15, 2011

(54) METHODS AND DEVICES FOR ENROLLMENT AND VERIFICATION OF BIOMETRIC INFORMATION IN IDENTIFICATION DOCUMENTS

(75) Inventor: Saraju P. Mohanty, Denton, TX (US)

(73) Assignee: University of North Texas, Denton, TX (US)

( * ) Notice: Subject to any disclaimer, the term of this patent is extended or adjusted under 35 U.S.C. 154(b) by 874 days.

(21) Appl. No.: 12/150,009

(22) Filed: Apr. 24, 2008

(65) Prior Publication Data

US 2010/0052852 A1 Mar. 4, 2010

Related U.S. Application Data

(60) Provisional application No. 60/928,326, filed on May 9, 2007.

(51) Int. Cl.
*G05B 19/00* (2006.01)
*H04L 29/00* (2006.01)

(52) U.S. Cl. ....................... 340/5.83; 340/5.53; 713/179

(58) Field of Classification Search .................. 235/380, 235/382–382.5; 283/72, 77, 79, 901, 902; 340/5.1–5.67, 5.81–5.83, 5.84, 5.86, 10.1; 358/3.28; 370/522–529; 380/45, 51, 54–56, 380/201, 268, 281, 282, 287; 705/57, 66; 713/170–181, 185, 186; 902/2–6; 726/23
See application file for complete search history.

(56) References Cited

U.S. PATENT DOCUMENTS 4,896,363 A 1/1990 Taylor et al.
4,993,068 A * 2/1991 Piosenka et al. .............. 713/186
5,067,162 A 11/1991 Driscoll et al.
6,292,092 B1 * 9/2001 Chow et al. .................... 340/5.6
6,397,334 B1 * 5/2002 Chainer et al. ................ 713/176
6,748,533 B1 * 6/2004 Wu et al. ........................ 713/176
6,865,676 B1 * 3/2005 Staring et al. ................. 713/176
6,930,707 B2 8/2005 Bates et al.
7,039,812 B2 * 5/2006 Kawan et al. ................. 713/186
7,062,069 B2 * 6/2006 Rhoads ......................... 382/100
7,111,167 B1 * 9/2006 Yeung et al. .................. 713/176
7,220,535 B2 * 5/2007 Lawandy et al. ............. 430/336
7,221,258 B2 * 5/2007 Lane et al. .................. 340/10.1
7,248,715 B2 * 7/2007 Levy ............................. 382/100
7,269,275 B2 * 9/2007 Carr et al. ..................... 382/100
7,457,957 B2 * 11/2008 Choi et al. .................... 713/176
7,502,934 B2 * 3/2009 Dietl ............................. 713/176
7,512,249 B2 * 3/2009 Alasia et al. .................. 382/100
7,664,264 B2 * 2/2010 Moskowitz et al. .......... 380/210
2003/0115459 A1 * 6/2003 Monk ........................... 713/168
2003/0179901 A1 * 9/2003 Tian et al. ..................... 382/100
2004/0039914 A1 * 2/2004 Barr et al. ..................... 713/176
2004/0071311 A1 * 4/2004 Choi et al. .................... 382/100
2007/0057764 A1 * 3/2007 Sato et al. .................... 340/5.52

OTHER PUBLICATIONS

VLSI Architecture and FPGA Prortyping of a Secure Digital Camera for Biometric Application, by Oluwayomi Bamidele Adamo, Thesis for Master of Science, University of North Texas, Aug. 2006.*

(Continued)

*Primary Examiner* — Benjamin C Lee
*Assistant Examiner* — Stephen Burgdorf
(74) *Attorney, Agent, or Firm* — Jackson Walker L.L.P.

(57) ABSTRACT

Methods and devices for the secure encryption, enrollment, verification, and decryption of biometric and biographical identification information. The unique sequence of steps and the use of a combination of visible watermarking, invisible-fragile watermarking decoding, invisible-robust extraction, and decryption watermarking and encryption provides multiple layers of protection with four biometric based keys and makes it practically impossible for the information to be tampered with.

14 Claims, 4 Drawing Sheets

OTHER PUBLICATIONS

Adamo, Oluwayomi Bamidele; "VLSI Architecture and FPGA Prototyping of a Secure Digital Camera for Biometric Application", Thesis prepared by the Degree of Master of Science, University of North Texas, Aug. 2006.*

O. B. Adamo, et al; VLSI Architecture and FPGA Prototyping of a Digital Camera for Image Security and Authentication; IEEE Region 5 Tech. and Sci. Conf.; p. 154-158, 2006.

O. B. Adamo, et al; VLSI Architecture for Encryption and Watermarking Units Towards the Making of a Secure Digital Camera, IEEE Int'l SOC Conference (SOCC), pp. 141-144, 2006.

P. A. Blythe, Biometric Authentication System for Secure Digital Cameras; Ph.D. Dissert., Dept. of Elect. and Computer Eng., Binghamton Univ., State University of NY, May 2005.

O. L. Friedman, "The Trustworthy Digital Camera: Restoring Credibility to the Photographic Image," IEEE Transactions on Image Processing, vol. 6, No. 4, p. 905-910, Nov. 1993.

S. P. Mohanty; Energy and Transient Power Minimization during Behavioral Synthesis; Ph. D. Dissert., Dept. of Comp. Science and Eng., University of South Florida; Oct. 2003.

S. P. Mohanty; VLSI Implementation of Visible Watermarking for a Secure Digital Still Camera Design, 17th IEEE Int'll Conference on VLSI Design (VLSID), pp. 1063-1068, 2004.

S. P. Mohanty; A VLSI Architecture for Visible Watermarking in a Secure Still Digital Camera (S2DC) Design; IEEE TVLSI, 13(7), Jul. 2005, p. 808-818.

S. P. Mohanty; VLSI Arch. of an Invisible Watermarking Unit for a Biometric-Based Security System in a Digital Camera; 25th IEEE Int'l Conf. on Cons. Elect., p. 485-486, 2007.

* cited by examiner

METHODS AND DEVICES FOR ENROLLMENT AND VERIFICATION OF BIOMETRIC INFORMATION IN IDENTIFICATION DOCUMENTS

This application claims priority to U.S. Provisional Patent Application Ser. No. 60/928,326, entitled "METHODS AND DEVICES FOR ENROLLMENT AND VERIFICATION OF BIOMETRIC INFORMATION IN IDENTIFICATION DOCUMENTS" filed on May 9, 2007, the entire content of which is hereby incorporated by reference.

BACKGROUND

This invention pertains to methods and devices for securely encoding and using biometric information as a form of identification.

With the threat of terrorism an everyday reality, border access control has become more important than ever. Traditional paper passports have many shortcomings when it comes to unauthorized modifications for the purpose of defeating security measures. "Enhancement of border security" and "facilitation of free and no resistance movement" of genuine travelers worldwide have become two contradictory objectives. The international community consisting of homeland security and state departments of various nations is working relentlessly to put a system in place to meet those objectives. One of the attempts in this direction is the issuance, adoption, and standardization of a new type of passport in place of conventional ones, known as an electronic passport or "E-Passport". The U.S. Department of Homeland Security is putting a tremendous amount of effort into developing an international standard for E-Passports, while the U.S. Department of State is issuing them. This E-Passport for reliable and accurate and possibly automatic authentication and verification is ideally based on biometric information. The initial deployment of e-passport readers, under the supervision of the U.S. Department of Homeland Security, is underway. The U.S. Congress has set a deadline requiring all U.S. ports of entry to implement e-passport readers by Oct. 26, 2006.

Currently, when paper passport and non-biometric based systems are used, the process of verification is often localized and the immigration authority at the port of entry often makes decisions with limited information available. Similarly, the access control in the corporate world or credit/debit/ATM processing centers is susceptible to fraud. The paper passport is susceptible to tampering and the determination that the passport holder is the legitimate owner is cumbersome and error prone.

Typically, the biometric information while digital and electronically stored and transmitted is susceptible to "skimming", "eavesdropping", and "chip cloning". Skimming is the process via which an unauthorized party retrieves the information stored in the host media by scanning its contents and requires physical access to it. On the other hand eavesdropping involves intercepting the information transmitted when the media is scanned at the electronic terminal and requires close physical proximity to it but no actual contact with it. Finally chip cloning refers to the process via which a legitimate media chip is duplicated by unauthorized means for the purpose of creating a forged document or chip. There is a need for development of techniques for protection of biometric information to maintain privacy.

Several attempts have been made to develop the different units of a digital camera with watermarking or encryption capabilities for protecting images and other multimedia data.

However, they are not explicitly proposed for biometric information protection. At the same time the few ones available dealing with biometric images or biometric information are inadequate for their protection.

A camera, with the aim of restoring credibility to photographic images using encryption, is described in Friedman 1993. The process described in this work suggests encrypting the picture that is captured by the camera. Thus the protection is just a single layer. The applicability of this camera for biometric binary information is not evident.

In U.S. Pat. No. 4,896,363, a system is presented that can match image characteristics such as fingerprint. Hence, this method uses the sole biometric data, fingerprint, for matching. It does not deal with protection of finger print image, which is the goal of our method invented.

In U.S. Pat. No. 5,067,162, a method is presented for personal identification using fingerprinting images. However, this invention is silent about the protection of the fingerprinting image, which is the essence of our invention.

Patent Application Publication No. US2001/000900370 proposes a camera that captures iris image for security applications. This does not deal with protection of the iris image; this does not provide any protection for the image that is being captured.

Patent Application Publication No. US2002/0080256A1 proposes a camera that can be used for anti-theft or privacy device using an iris image. However, this does not deal with protection of the iris image, and this does not provide any protection for the image that is being captured.

In Mohanty 2003, Mohanty 2004, and Mohanty 2005, a concept of a secure digital camera is introduced that uses a watermarking algorithm for ensuring copyright of the images that is being captured by the camera. This is essentially a single layer protection to the image that is being captured. This is simply not adequate to provide multilayer protection to the biometric information. In the same context the Field Programmable Gate Array ("FPGA") implementation is performed in Adamo 2006. The above concept is further enhanced in Adamo 2006 and Mohanty 2007, using biometric data as images and proposing to store them in the host image. It can provide a maximum double layer protection (through use of encryption and invisible watermarking), but is very much vulnerable to attackers. First it suggests visibly printing the UPC on the picture, which is clearly not acceptable as this information can be used by hackers. It also suggests printing a host image that stores the biometric information on a passport which is again not acceptable as the stored data in it can be susceptible to attacks. This method uses a single key and hence a lesser level of security. The authors suggest using images of biometric data (contrary to binary biometric information) which can be susceptible to signal processing attacks more easily, thus making the recovery process less reliable. Moreover, this form of image hiding inside an image can degrade the image quality as more data needs to be stored to be useful for authentication.

In Blythe 2005, a biometric authentication system in the context of the camera is presented. This uses iris image to address integrity, origin, and ownership issues of the image that is being captured using watermarking and hash function. However, this does not deal with protection of the iris image that it uses for authentication.

On the other hand our invention deals with protection of the image that is being captured at the same time protection of the biometric information that it acquires. Our invention provides multilayer protection to the biometric information, yet another distinct difference. In summary, our invention differs from process, process sequence, what is being protected, applicability, and device structure.

SUMMARY

E-passports where the biometric information regarding the bearer is embedded in electronic form (typically an RF-ID chip) will clearly lead the way into the future of secure identification. A foolproof E-Identity Card (E-ID) that can provide access control to employees of a corporate world can be based on storage of biometric information. With similar requirements and needs, a driving license (DL) that is already being used as a source of identification all over the U.S.A. can be embedded with biometric information. Similarly, to avoid credit card fraud and identity theft, the credit cards can have embedded biometric information of the credit/debit/ATM card holder. There are several issues that must be addressed before the biometric information can be securely and safely stored in the host media (such as E-Passports, E-Identity Card, Driving Licenses (DL), and Credit/Debit/ATM Cards) and can be effectively deployed. The invention presented here is a contribution in that direction. The claimed methods and devices verify biometric information that is present in the host media securely, reliably, and uniquely such that they can not be stolen by an unauthorized person to misuse.

This invention presents methods and devices that use encryption (decryption), invisible-robust watermarking (extraction), and invisible-fragile watermarking (decoding) together in unique ways to provide accurate verification and authentication when the biometric information is stored with multiple layers of protection. Secure processing, transportation and storage of the biometric information embedded in the host media is also provided for. The methods will process the applicant's image along with the usual biographic information present in a host media. The passport/card is issued by the issuing authority. At this location, officials capture the person's image and biometric attributes and store the appropriate information to an RFID chip through an RFID writer. At the same time, the data is sent to a central database through secure channels.

First, the visible watermark which can be a transparently embedded U.S. emblem, state map, corporate ID, or something similar on the bearer's facial image is checked as first hand proof of the validity of the host media. This can immediately be followed by invisible-fragile watermark decoding and determination of possible tampering of the host media. Biometric data such as fingerprint and iris scans will be collected, encrypted through the use of randomly generated keys and subsequently inserted in the applicant's image as an invisible-robust watermark. This information and the encryption keys are stored in two places: an RF-ID chip embedded into the host media and, through secure channels, a centralized database accessible only by authorized issuing authorities. Thus, it is practically impossible for hackers, terrorists, and unauthorized users to get access to any useful biometric information and misuse it. Unsymmetrically opposite sequence of steps are followed for identification, authentication, and tamper detection. While the biometric attributes may include unique personal features, such as facial contours, iris, fingerprint and finger geometry, and signature, other personal information such as name, address, date of birth, gender, immigration status, and the like can also be included in the host media.

The current devices can be in the form of a digital camera that can embed/enroll biometric information and watermarks while encrypting them in the host media. The device acts to provide encryption and watermarking technologies before the biometric information is transported and stored in the RF-ID of the host media. An electronic appliance similar to a digital camera employs such techniques right at the time of capture. The device should have encryption, invisible-robust watermarking insertion, invisible-fragile watermarking insertion, and visible watermarking insertion capabilities along with the traditional functionalities of a digital camera to suit these requirements. The device should be able to handle and encode into the host media unique personal features, such as, facial contours, iris, fingerprint and finger geometry, and signature, as well as other personal information, such as, name, address, date of birth, gender, immigration status, and the like.

The methods and devices provide, for the first time, biometric and biographical information and random encryption keys fused in a seamless method of secure and tamper-proof authentication. The invention will impact homeland security as U.S. Department of States can use it in E-Passport processing. The method can be used by authorities of various States while issuing the Driving Licenses. Bank and Credit Card companies can use the technique to store biometric information in credit/debit/ATM cards securely, accurately, and safely. The corporate world, national laboratories, nuclear power plants, power stations, Banks, and Universities can use the technique while issuing cards to their employees and students to securely store biometric information.

DETAILED DESCRIPTION OF PREFERRED EMBODIMENTS

Figure 1:
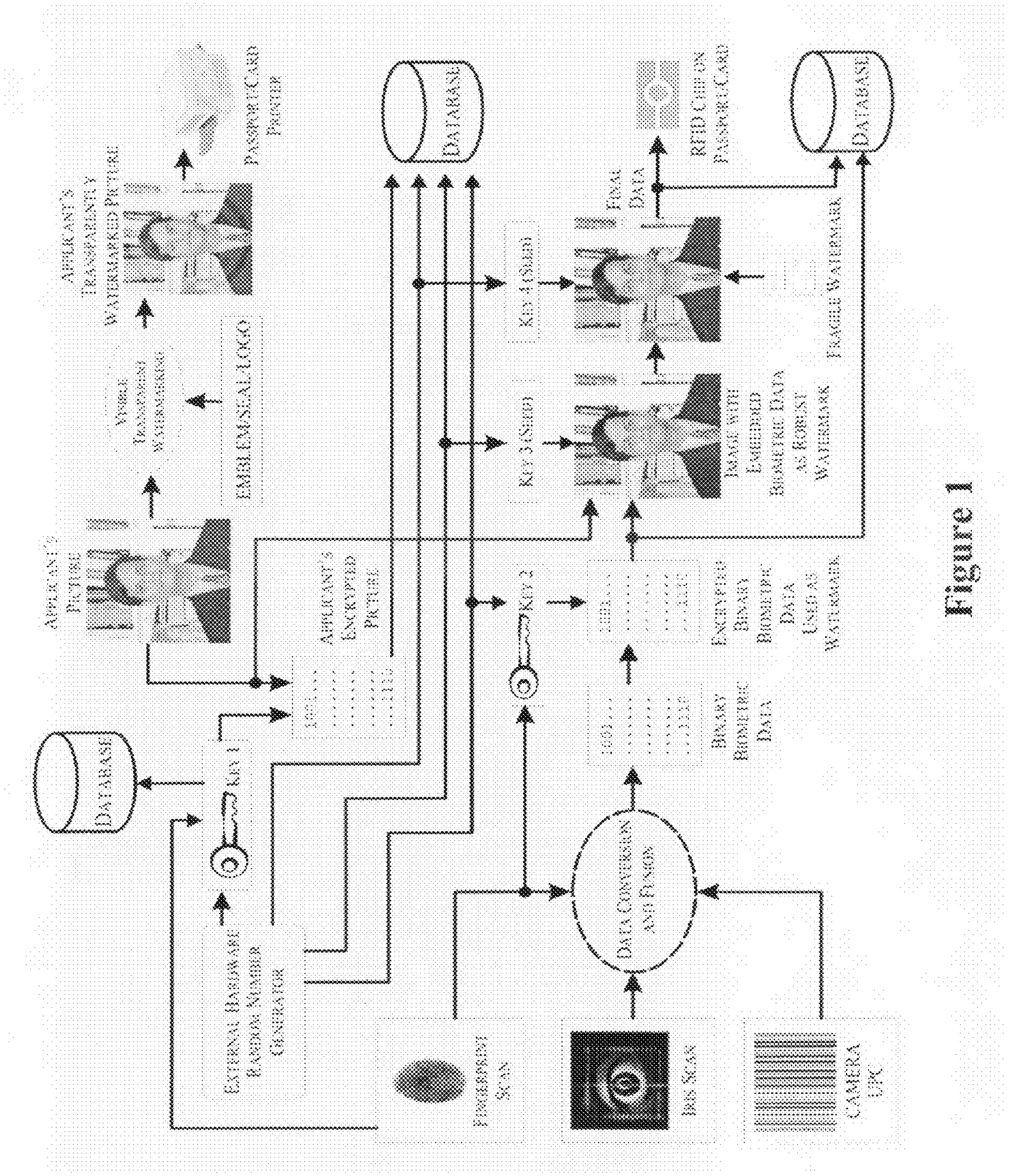
FIG. 1 shows an example of a preferred embodiment of a method for protecting biometric information as it is stored in a central database and used in an identification document.

One embodiment of the current invention is a method for the protection of biometric information before it is stored in a central database or written to an RFID chip of an electronic document, such as an e-passport. The method involves a sequence of encryption and watermarking technology in which keys are constructed from random numbers and biometric information. A preferred embodiment of this enrollment method is shown in FIG. 1. In this example, the method has the following sequence of steps.

First, collect the biographic information of the passport applicant and store it in the central database. Then, generate four random numbers keys. Two random keys serve as the partial keys for encryption, a third random key serves as the key for the invisible-robust watermarking, and a fourth random key serves as the key for the invisible-fragile watermarking. Next, scan the iris image of the passport applicant, scan the fingerprint image of the passport applicant, and capture the facial image of the passport applicant. Next, form a first encryption key 1 merging the first random generated key with the fingerprint. Then, encrypt the facial image and store it in the central database. Then acquire the Universal Product Code (UPC) of the camera/scanner that captures the biometric information. This can maintain unique identification of the source-end of the passport/card. Next, fuse the biometric information (iris and fingerprint scans) along with the UPC of the scanning equipment to generate a binary image that maybe called a “biometric watermark image.” In the next step, form a second encryption key merging the second random generated key with the fingerprint data. Encrypt the biometric watermark image and store it in the central database. The encrypted host image and the encrypted binary biometric image both are stored in the central database for later use by appropriate authorized personnel.

In the following step, embed the binary biometric watermark image in the facial image of the passport applicant through an invisible-robust watermarking technique using the third random key. Watermark the above generated image with invisible-fragile watermarking using the fourth random generated key. The resulting facial image now contains all the biometric information and is stored on the RFID chip of the passport/card. Next, watermark the original facial image with the emblem/logo/seal using a visible-transparent watermarking technique and send to the printer to be printed on the passport/card along with the usual biographic information. Finally, send the two constructed encryption keys (first and second) and two generated watermarking keys (third and fourth) to the central database.

Figure 2:
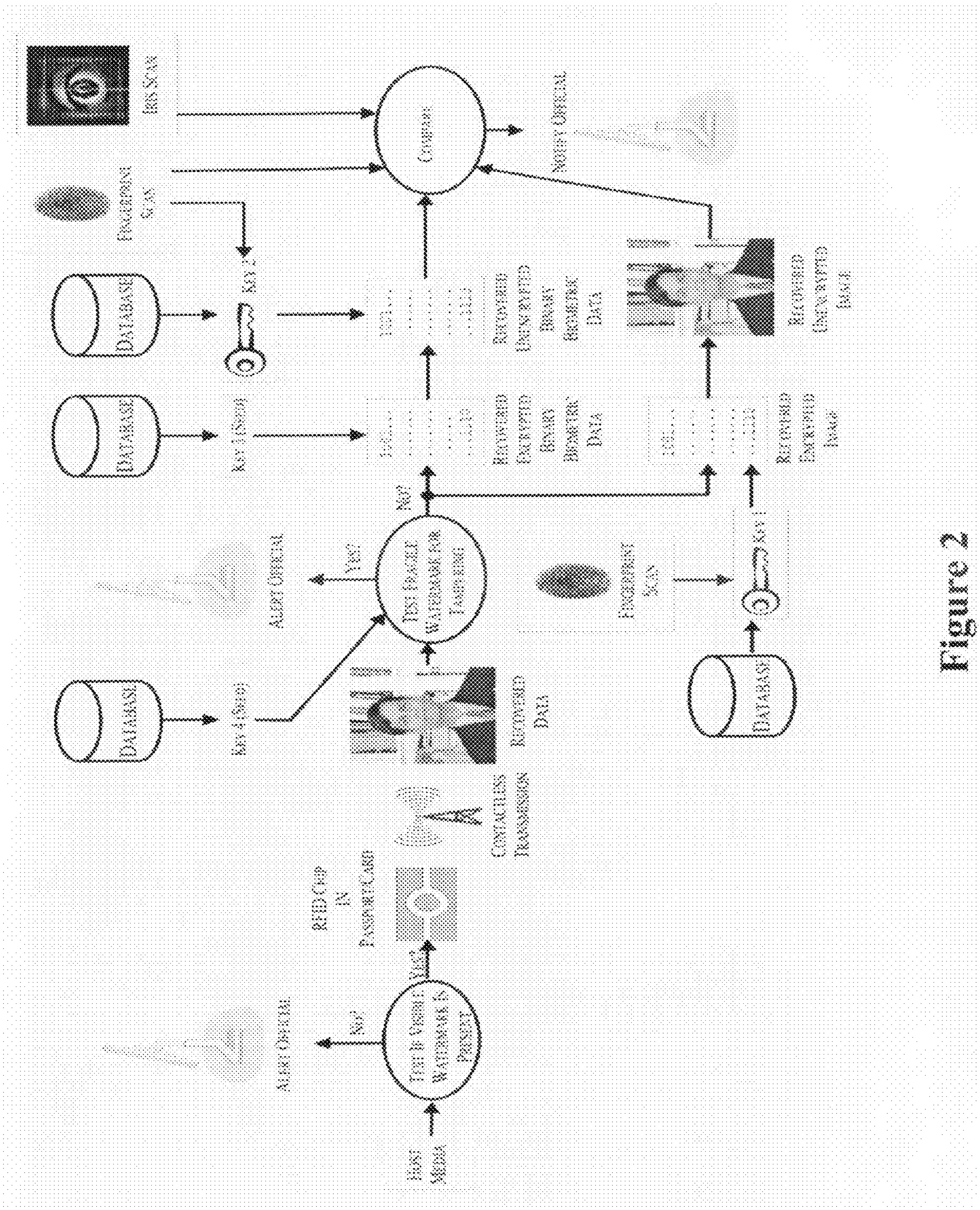
FIG. 2 shows an example of a preferred embodiment of a method for verifying biometric information used in an identification document.

Another embodiment of the current invention is a method for the verification and authentication of an electronic document, such as an e-passport, that has embedded encrypted biometric information. A preferred embodiment of the method is shown in FIG. 2. In this example, the method has the following sequence of steps.

First, verify whether the transparent visible watermark is present on the passport/card as the first hand proof of authentication and verification process. If it is not present, the authority needs to be informed as the passport/card have been tampered with. The subsequent steps of verification process may or may not be carried forward. Next, read the RFID chip and access the encrypted biometric information stored in it. Then, collect the biographic information of the passport holder and scan the biometric information (such as iris and fingerprint) of the passport holder for verification and authentication. Next, access the fourth random key used for the invisible-fragile watermarking from the database. Verify the invisible-fragile watermark in the data accessed from the RFID chip to check for possible tampering. If the test fails, then the passport is forged and/or has been tampered with. Thus, there is no need to conduct subsequent steps of the verification process. Next, access the third random key from the database that was used for the invisible-robust watermarking. Then extract the encrypted binary biometric watermark image from the facial image of the data read from the RFID chip by using an invisible-robust watermarking extraction technique.

In the next step, access the partial second key from the database and merge the fingerprint characteristic data scanned to construct the complete key locally. Using this constructed key, decrypt the biometric watermark image. After that, separate the iris image from the biometric watermark image and perform iris scan matching; i.e., iris scan separated with iris scan collected. Then access the partial first key from the database and construct the complete key locally with the fingerprint scanned information. Finally, access the encrypted facial image from the database and decrypt it with the locally constructed key. Perform facial image matching using the RFID stored image with the decrypted image accessed from the database. Note that the facial image of the passport holder is not collected locally again because the facial features of the passport holder might have changed since he was issued the passport. Instead, the original stored image is used.

Figure 3:
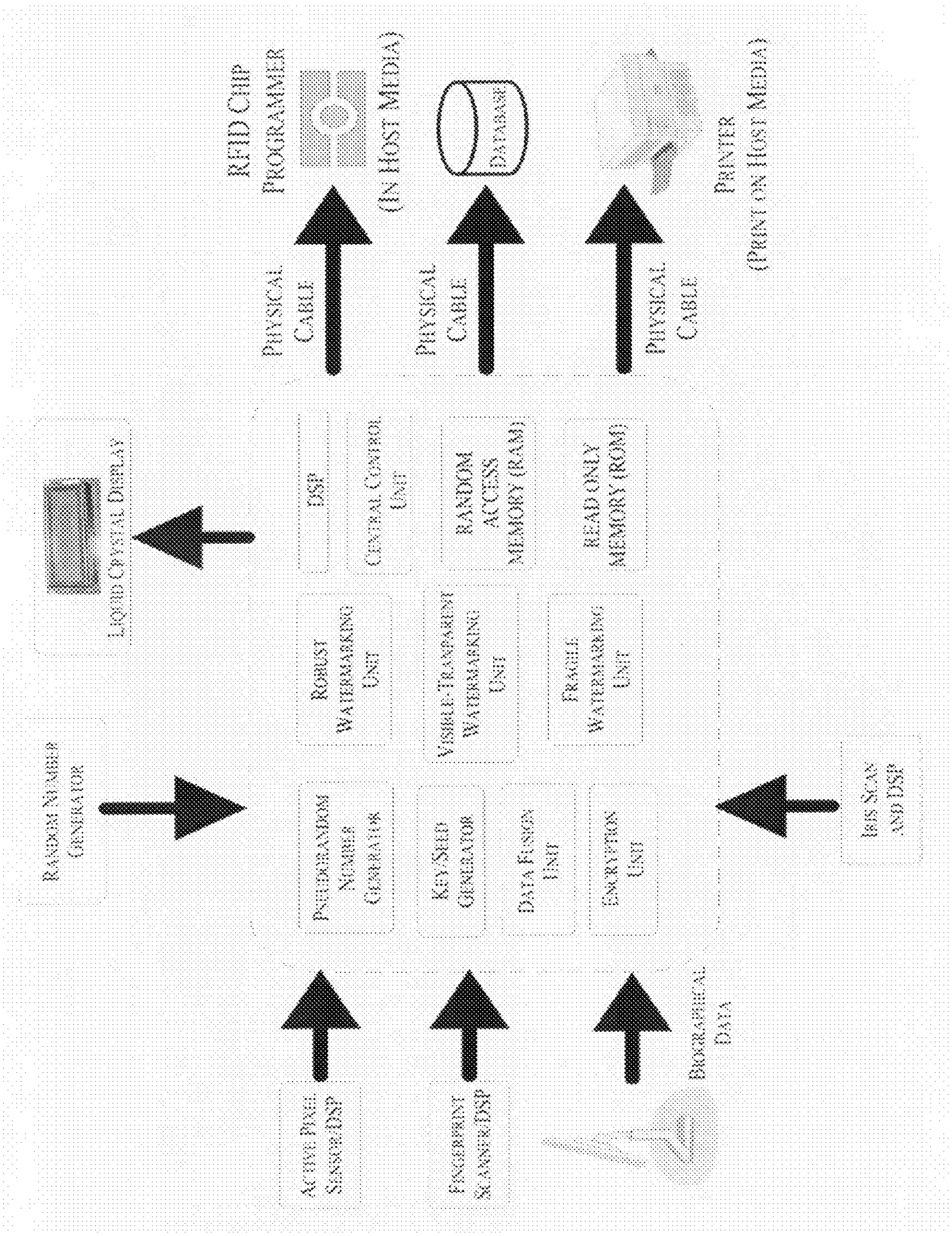
FIG. 3 shows an example of a preferred embodiment of a device for collecting and encoding biometric information into a central database and an identification document.

Another preferred embodiment is a device, such as a new digital camera, that can encode a series of biometric information into the host media, such as an electronic document or passport. An example of the device is shown in FIG. 3. The device can have several new modules and interfaces in addition to digital signal processors (DSPs), on-chip memory, and liquid crystal display (LCD) screen, typically available in digital cameras. The active pixel sensor (APS) and various scanners collect the biometric data of the individual for encoding in host media that will be issued to the individual, such as E-Passports, E-Identity Card, Driving Licenses (DL), and Credit/Debit/ATM Cards. In addition, biographic data that is collected at a monitor-keyboard terminal resides in database which is accessible to the device. The proposed device has several distinct modules/units each having their functionality. Depending on the user requirements and applications, a user can use several of them at a time to perform the biometric enrollment process for different host media. The different units of the device as well as their functionalities are as follows:

(1) Active Pixel Sensor/DSP—this unit captures the facial image of an individual and converts it to digital data;

(2) Fingerprint Scanner/DSP—this unit captures the fingerprint and then converts it to binary information;

(3) External hardware random number generator—this unit generates random numbers which can be used as keys for watermarking and encryption;

(4) Liquid crystal display (LCD)—This unit is used for display of images and data which are being processed, used, and handled by the device;

(5) Pseudorandom Number generator—this unit generates pseudorandom numbers to be used as watermark in invisible-fragile watermarking unit;

(6) Key/Seed generator—this unit generates key for encryption using the random number and fingerprint scanning;

(7) Invisible-Robust Watermarking Insertion Unit—this unit performs invisible-robust watermarking insertion (also known as embedding or encoding). This unit will hide the biometric information in the host facial image as a watermark;

(8) Invisible-Fragile Watermarking Insertion Unit—this unit performs invisible-fragile watermarking insertion;

(9) Visible-Transparent Watermarking Unit—this unit is used to perform visible watermarking of facial image with image of National emblem, state map, corporate logo, etc. transparently;

(10) Encryption Unit—this unit performs encryption of relevant information, for example biometric information, as well as any information that needs to be sent from the device to a database that will store them permanently;

(11) Information Fusion Unit—this unit has the capability to reliably merge the different biometric information collected and make single unified information that can be hidden in the host image;

(12) UPC ROM—this is a permanent memory that will store the UPC for the camera, which can be accessed by different processing units and can be embedded along with biometric information for uniquely identifying the origin of host media;

(13) On-Chip RAM—this is the on-chip memory that can be used temporarily during the computation by different resources or units;

(14) Central controller unit—this unit will co-ordinate the operations among all the functional units and perform a sequence of operations using them depending on different applications; and

(15) DSP—this unit performs standard digital signal processing on multimedia data.

Figure 4:
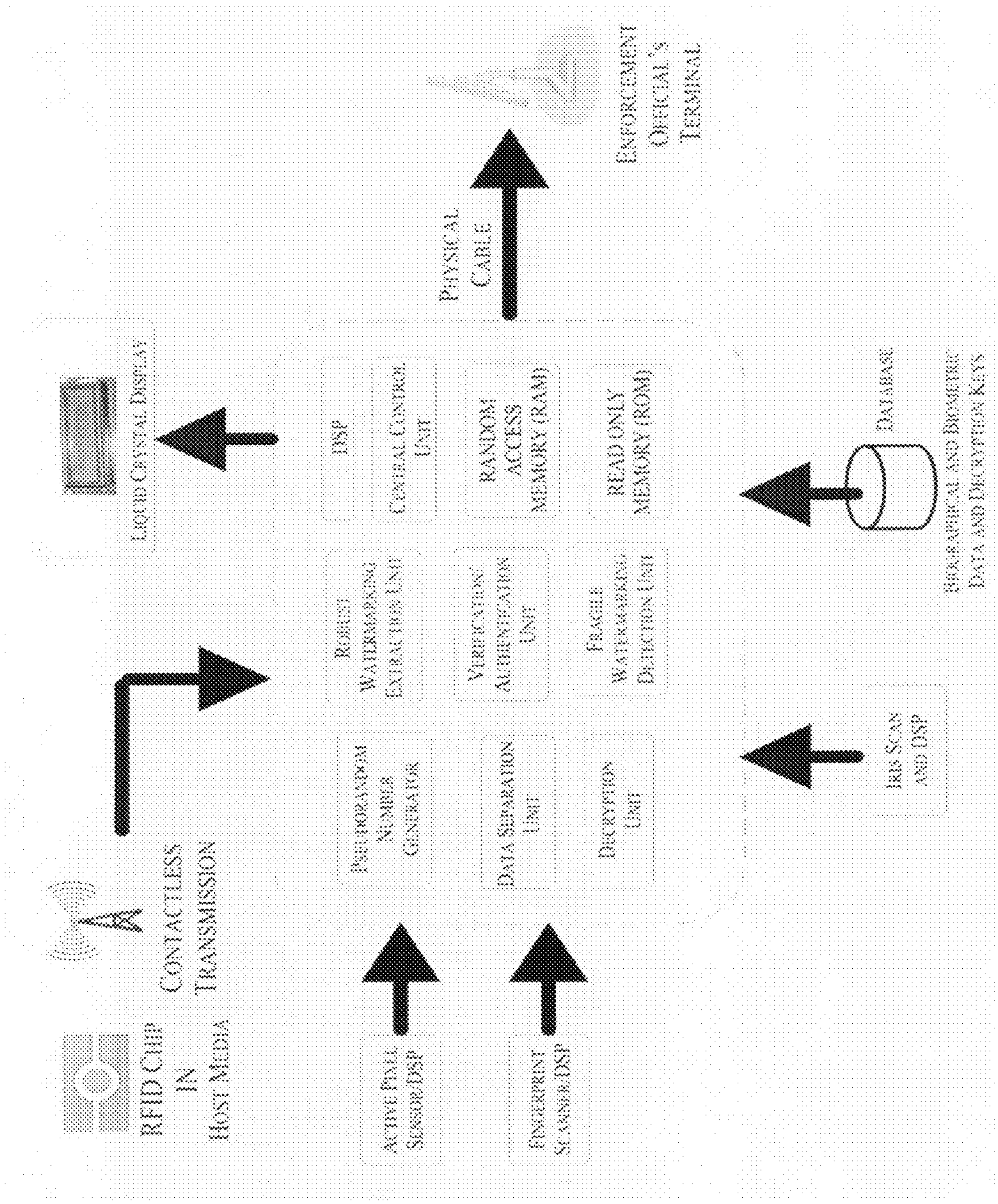
FIG. 4 shows an example of a preferred embodiment of a device for verifying biometric information encoded in an identification document.

Another preferred embodiment is a device that can extract biometric information from the host media, then verify the information extracted with the original information, and authenticate the bearer of host media. It can use watermark-extraction and watermarking-decoding techniques and decryption in a unique sequence on the host media such that the biometric information cannot be stolen or misused by any unauthorized person while verifying and authenticating card holder's identity. An example of the device is shown in FIG. 4. The proposed device has several distinct modules/units each having their functionality. Depending on the user requirements and applications, a user can use several of them at a time to perform the biometric decryption process for different host media. The different units of the device as well as their functionalities are as follows:

(1) Active Pixel Sensor/DSP—this unit captures facial image of the bearer and converts it to digital data;

(2) Fingerprint Scanner/DSP—this unit captures the fingerprint of the bearer and then converts it to binary information;

(3) Iris Scanner/DSP—this unit captures the iris image of the bearer and then converts it to binary information;

(4) Liquid crystal display (LCD)—this unit is used for display of images and data, which are being processed, used, and handled by the device;

(5) Pseudorandom number generator—this unit generates pseudorandom to be used as a binary watermark for the type of invisible watermarking who rely on such watermark;

(6) Data Separation Unit—this unit has capability to reliably separate the different biometric information collected and make them individual biometric information to be used for verification and authentication;

(7) Decryption Unit—this unit performs decryption of relevant information, for example biometric information as well as any information that was embedded in the data stored;

(8) Robust Watermarking Extraction Unit—this unit performs robust watermarking extraction;

(9) Fragile Watermarking Detection Unit: this unit performs fragile watermarking detection or decoding;

(10) Verification/Authentication Unit—this unit is used to verify the data encrypted into the host image;

(11) UPC ROM—this is a permanent memory that will store the UPC for the camera, which can be accessed by different processing units and can be used along with biometric information for uniquely identifying the origin of host media;

(12) On-Chip RAM—this is the on-chip memory that can be used temporarily during the computation by different resources or units;

(13) Central Controller Unit—this unit will co-ordinate the operations among all the functional units and performs a sequence of operations using them depending on different applications; and

(14) DSP—this unit performs standard digital signal processing on multimedia data.

The preferred enrollment and verification methods and devices will make the biometric information practically impossible to hack, tamper with, or clone and help to uniquely, securely, and reliably establish ownership and identity. The use of a sequence of visible watermarking, invisible-fragile watermarking decoding, invisible-robust extraction, and decryption watermarking and encryption will provide multilayer protection to the biometric information and establish unique ownership and identity. The proposed unique sequence of steps consisting of encryption and watermarking ensures such protection. Encryption using an unique biometric based key, and invisible-robust watermarking extraction, protect the data and make it inaccessible to unauthorized parties. Invisible-fragile watermarking detects whether any tampering has taken place on the stored biometric information and, in the case of tampering, its extent. The visible transparent watermarking explicitly expresses the passport/card issuing authority, and if absent provides a first hand proof of possible tampering of the passport/ID/cards. The inclusion of the UPC of the source-end camera, along with the biometric information, always maintains the identity of the unique source of the passport/card. The same image that goes to the RFID chip itself is not printed because the information stored in it can be susceptible to hacking even though it is invisible.

To break the proposed verification system, 4 different keys would be necessary along with fingerprint scanning binary information. The key created is a combination of generated random number with binary fingerprint information, which makes the keys very unique. At the same time, instead of using images of biometric information, binary sequences generated from the same are used. These ensure maximum information hiding with minimal payload; thus, taking maximum advantage of the invisible-robust watermarking scheme while preserving image quality.

The invention can be implemented in several ways, including a complete software based implementation using C/MATLAB/Verilog/VHDL/Verilog-AMS/VHDL-AMS/Verilog-AMS/VHDL-AMS, a Simulink based system implementation, a field programmable gate array (FPGA) implementation, and a silicon based complete system-on-a-chip ("SoC") implementation.

The invention can be used for forensic and homeland security applications. In many situations police officials provide images as forensic evidence against criminals and face possible rejection on the grounds of authenticity or lack of documentation showing how the images were captured during the activity. It is also possible that the images could be pirated or manipulated when passed between law enforcement agencies. The integrity of the images and the information can be prevented using the invention. The invention can be used to ensure beyond a doubt that such a manipulation has not occurred and the image is authentic.

REFERENCES CITED

The following U.S. Patent documents and publications are hereby incorporated by reference.

U.S. PATENT DOCUMENTS

U.S. Pat. No. 4,896,363
U.S. Pat. No. 5,067,162
Patent Application Publication No. US2001/000900370
Patent Application Publication No. US2002/0080256A1

OTHER PUBLICATIONS

O. B. Adamo, S. P. Mohanty, E. Kougianos, M. Varanasi, and W. Cai, "VLSI Architecture and FPGA Prototyping of a Digital Camera for Image Security and Authentication," in

*Proceedings of the IEEE Region 5 Technology and Science Conference*, pp. 154-158, 2006.

O. B. Adamo, S. P. Mohanty, E. Kougianos, and M. Varanasi, "VLSI Architecture for Encryption and Watermarking Units Towards the Making of a Secure Digital Camera," in *Proceedings of the IEEE International SOC Conference* (*SOCC*), pp. 141-144, 2006.

P. A. Blythe, "Biometric Authentication System for Secure Digital Cameras," Ph. D. Dissertation, Department of Electrical and Computer Engineering, Binghamton University, State University of New York, May 2005.

O. L. Friedman, "The Trustworthy Digital Camera: Restoring Credibility to the Photographic Image," *IEEE Transactions on Image Processing*, vol. 6, no. 4, pp. 905-910, November 1993.

S. P. Mohanty, "Energy and Transient Power Minimization during Behavioral Synthesis," Ph. D. Dissertation, Department of Computer Science and Engineering, University of South Florida, October, 2003.

S. P. Mohanty, N. Ranganathan, and R. K. Namballa, "VLSI Implementation of Visible Watermarking for a Secure Digital Still Camera Design," *Proceedings of the 17th IEEE International Conference on VLSI Design* (*VLSID*), pp. 1063-1068, 2004.

S. P. Mohanty, N. Ranganathan, and R. K. Namballa, "A VLSI Architecture for Visible Watermarking in a Secure Still Digital Camera ($S^2DC$) Design", *IEEE Transactions on Very Large Scale Integration Systems* (*TVLSI*), Vol. 13, No. 7, July 2005, pp. 808-818. (Also, Vol. 13, No. 8, August 2005, pp. 1002-1012.)

S. P. Mohanty, O. B. Adamo, and E. Kougianos, "VLSI Architecture of an Invisible Watermarking Unit for a Biometric-Based Security System in a Digital Camera," in *Proceedings of the 25th IEEE International Conference on Consumer Electronics* (*ICCE*), pp. 485-486, 2007.

What is claimed is:

1. A method for preparing a secure identification document for an individual using a device capable of capturing biometric information, comprising the steps of:

collecting biographic information from the individual;

generating first, second, third, and fourth random numeric keys and storing the first, second, third, and fourth random numeric keys in a central database;

obtaining a facial image from the individual;

obtaining additional verification images of biometric information from the individual;

merging the first random numeric key with one of the additional verification images of biometric information to create a first encryption key;

encrypting the facial image using the first encryption key and storing it in the central database;

merging one or more of the additional verification images of biometric information from the individual with a unique code associated with the device to create a biometric watermark image;

merging the second random numeric key with one of the additional verification images of biometric information to create a second encryption key;

encrypting the biometric watermark image with the second encryption key and storing the encrypted biometric watermark image in the central database;

embedding the encrypted biometric watermark image in the facial image of the individual using invisible-robust watermarking and the third random numeric key to create a biometric watermark facial image;

watermarking the biometric watermark facial image using invisible-fragile watermarking and the fourth random numeric key to create a final facial image and storing the final facial image on a storage chip associated with the secure identification document;

watermarking the facial image of the individual with a selected design using visible-transparent watermarking to create a visible watermarked facial image;

storing the first encryption key, second encryption key, biometric watermark facial image, and final facial image in the central database;

printing the visible watermarked facial image and the biographical information on the secure identification document; and attaching the storage chip to the secure identification document.

2. The method of claim 1, wherein the secure identification document is a passport, driver's license, credit card, bank card, debit card, ATM card.

3. The method of claim 1, wherein the additional verification images of biometric information from the individual are selected from the group consisting of fingerprint images, iris images, facial contour images, finger geometry images, signatures, and combinations thereof.

4. The method of claim 1, wherein the first encryption key is created by merging the first random numeric key with a fingerprint image.

5. The method of claim 1, wherein the biometric watermark image is created by merging the unique code with a fingerprint image and an iris image.

6. The method of claim 1, wherein the unique code associated with the device is a Universal Product Code ("UPC").

7. The method of claim 1, wherein the storage chip is an RFID chip.

8. The method of claim 1, wherein the selected design is any emblem, logo, seal, design, or pattern.

9. The secure identification document prepared according to the method of claim 1.

10. A method for verifying the identify of an individual possessing the secure identification document of claim 9, comprising the steps of:

verifying the presence of a visible watermark on the visible watermarked facial image;

accessing the final facial image from the storage chip;

obtaining the fourth random numeric key from the central database;

verifying the invisible-fragile watermarking on the final facial image;

obtaining present images of biometric information from the individual;

obtaining the third random numeric key from the central database;

extracting the biometric watermark image from the biometric watermark facial image using invisible-robust watermarking extraction;

obtaining the second random numeric key from the central database;

merging the second random numeric key with one of the present images of biometric information from the individual used to create the second encryption key to create a new second encryption key;

using the new second encryption key to create a decrypted biometric watermark image;

separating the additional verification images of biometric information used to create the biometric watermark image from the biometric watermark image;

obtaining the first random numeric key from the central database;

merging the first random numeric key with one of the present images of biometric information from the individual used to create the first encryption key to create a new first encryption key;

using the new first encryption key to create a decrypted facial image; and comparing the decrypted facial image with the decrypted biometric watermark image to verify identity.

11. The method of claim 10, wherein the secure identification document is a passport, driver's license, credit card, bank card, debit card, or ATM card.

12. The method of claim 10, wherein the present images of biometric information from the individual are selected from the group consisting of fingerprint images, iris images, facial contour images, finger geometry images, signatures, and combinations thereof.

13. The method of claim 10, wherein the storage chip is an RFID chip.

14. The method of claim 10, wherein if any step of the method of verifying fails, the remaining steps are not performed and the identity of the individual is not verified.

* * * * *